US012036094B1

(12) United States Patent
Zhang et al.

(10) Patent No.: US 12,036,094 B1
(45) Date of Patent: Jul. 16, 2024

(54) QUANTITATIVE AND PRECISE GAS ANESTHESIA METHOD AND DEVICE FOR EXPERIMENTAL ANIMALS

(71) Applicant: SICHUAN UNIVERSITY, Sichuan (CN)

(72) Inventors: Bo Zhang, Sichuan (CN); Jingyang Lou, Sichuan (CN); Zhihe Zhao, Sichuan (CN); Jie Fang, Sichuan (CN); Xinqi Huang, Sichuan (CN); Guanyin Zhu, Sichuan (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/403,904

(22) Filed: Jan. 4, 2024

(30) Foreign Application Priority Data

Mar. 29, 2023 (CN) ......................... 202310319618.3

(51) Int. Cl.
*A61D 7/04* (2006.01)

(52) U.S. Cl.
CPC ...................................... *A61D 7/04* (2013.01)

(58) Field of Classification Search
CPC ............ A61D 7/00–04; A62B 7/00–04; A62B 9/00–06; A62B 18/00; A62B 18/006–08; A61M 16/06–0694; A61M 16/104; A61M 16/18–186; A61M 2202/048
See application file for complete search history.

(56) References Cited

U.S. PATENT DOCUMENTS 4,593,421 A * 6/1986 Cohen .................... E04H 4/1227 4/510
7,464,707 B2 * 12/2008 Dalgetty .................. A61D 7/04 128/203.15
2004/0216737 A1 * 11/2004 Anderson ................ A61D 7/04 128/203.12

(Continued)

FOREIGN PATENT DOCUMENTS

CA 2665421 A1 4/2008
CN 110882087 A 3/2020

(Continued)

OTHER PUBLICATIONS

Pan Pan et al., Analysis of diversion capacity of water-rock diversion pool with inclined cover plate, Journal of Zhejiang University (Engineering Science) , Aug. 2016, pp. 1456-1462, vol. 50, No. 8.

(Continued)

*Primary Examiner* — Rachel T Sippel
*Assistant Examiner* — Jacqueline M Pinderski

(57) ABSTRACT

The present invention belongs to the field of animal gas anesthesia, and provides a quantitative and precise gas anesthesia method and device for experimental animals. The quantitative and precise gas anesthesia device for experimental animals includes an anesthetic fluid tank, a drainage tube, catheters, closed animal anesthetic tanks, and a recycling container, where anesthetic fluid is put into the anesthetic fluid tank, the bottom of the anesthetic fluid tank is connected to an inlet of the drainage tube, a set of holes are evenly arranged in the drainage tube, each hole is connected to an inlet of each catheter, and outlets of the catheters extend into the closed animal anesthetic tanks.

7 Claims, 1 Drawing Sheet

(56) References Cited

U.S. PATENT DOCUMENTS

| | | | | |
|---|---|---|---|---|
| 2006/0278222 | A1 | 12/2006 | Schermeier et al. | |
| 2010/0006093 | A1 * | 1/2010 | Sannie | A61D 7/04 128/203.12 |
| 2022/0280735 | A1 * | 9/2022 | Pyeon | A61M 16/01 |

FOREIGN PATENT DOCUMENTS

| | | | |
|---|---|---|---|
| CN | 210811754 | U | 6/2020 |
| CN | 214912327 | U | 11/2021 |
| CN | 115553967 | A | 1/2023 |
| JP | H0535151 | U | 5/1993 |
| JP | 2005279218 | A | 10/2005 |
| JP | 2006288560 | A | 10/2006 |
| TW | 201429458 | A | 8/2014 |

OTHER PUBLICATIONS

Luo Nanfu et al., Preliminary study on the method of inhalation anesthesia and its effect on oxygen flow in experimental rabbits, Laboratory Animal and Comparative Medicine, Mar. 2006, pp. 40-41, vol. 26, No. 1.
First Office Action of counterpart Chinese Patent Application No. 202310319618.3 dated May 6, 2023.
First Search Report of counterpart Chinese Patent Application No. 202310319618.3 issued on May 5, 2023.
Supplementary Search Report of counterpart Chinese Patent Application No. 202310319618.3 issued on May 19, 2023.
Notice of Allowance of counterpart Chinese Patent Application No. 202310319618.3 issued on May 24, 2023.

* cited by examiner

QUANTITATIVE AND PRECISE GAS ANESTHESIA METHOD AND DEVICE FOR EXPERIMENTAL ANIMALS

CROSS-REFERENCE TO RELATED APPLICATION

The present application claims priority from Chinese Patent Application No. 202310319618.3 filed on Mar. 29, 2023, the contents of which are incorporated herein by reference in their entirety.

TECHNICAL FIELD

The present invention relates to the field of animal gas anesthesia, in particular to a quantitative and precise gas anesthesia method and device for experimental animals.

BACKGROUND

When conducting medical experiments on animals, the animals are usually anesthetized by volatilizing ether or isoflurane into gas. However, when anesthetizing a large number of animals, it is impossible to change the dosage of ether or isoflurane according to actual conditions such as different weights and different types of the animals to precisely quantify anesthetic, resulting in poor anesthesia effect. A too small dosage of the anesthetic affects the anesthesia effect, increases the pain of experimental animals during surgery, and violates medical ethics; at the same time, since the animals are not completely anesthetized, there is physical resistance during surgery, which affects the effect of the surgery. An excessive dosage of the anesthetic can lead to death of the animal and interfere with the experiment.

Therefore, there is a need to provide a quantitative and precise gas anesthesia method and device for experimental animals to solve the above problems.

SUMMARY

The purpose of the present invention is to provide a quantitative and precise gas anesthesia method and device for experimental animals, aiming to solve the problem that existing anesthesia methods and devices cannot provide quantitative and precise anesthesia.

In order to solve the above technical problems, the purpose of the present invention is achieved by means of the following technical solutions: provided is a quantitative and precise gas anesthesia method for experimental animals, which method includes:

an anesthetic fluid tank being used for holding anesthetic fluid, the bottom of the anesthetic fluid tank being connected to an inlet of a drainage tube, evenly arranging several holes in the drainage tube, each hole being connected to an inlet of each catheter, and outlets of the catheters extending into closed animal anesthetic tanks; putting experimental animals into the closed animal anesthetic tanks, and placing a recycling container below an outlet of the drainage tube; and providing a switch on the drainage tube;

defining T as the height difference between the level of the anesthetic fluid in the anesthetic fluid tank and water inlets of the catheters; defining G as a flow rate coefficient; defining N as a flow rate at the end of the drainage tube; defining R as the sum of flow rates of the catheters per unit length on the drainage tube; and defining S as a diversion length of the drainage tube;

selecting experimental animals of different weights and different types for anesthesia experiments, where the experimental animals of different types are numbered A1, A2, A3 to An, type A1 experimental animals of different weights are numbered A11, A12, A13 to A1n, type A2 experimental animals of different weights are numbered A21, A22, A23 to A2n, type An experimental animals of different weights are numbered An1, An2, An3 to Ann, precise anesthetic fluid dosages required for the experimental animals numbered A11, A12, A13 to A1n to meet experimental requirements are respectively a11, a12, a13 to a1n, precise anesthetic fluid dosages required for the experimental animals numbered A21, A22, A23 to A2n to meet experimental requirements are respectively a21, a22, a23 to a2n, and precise anesthetic fluid dosages required for the experimental animals numbered An1, An2, An3 to Ann to meet experimental requirements are respectively an1, an2, an3 to ann; and recording the above experimental data as known data;

defining the flow rate of a single catheter as r and the number of catheters arranged on the drainage tube per unit length as z, and establishing a calculation model for the height difference between the level of the anesthetic fluid in the anesthetic fluid tank and the water inlets of the catheters, the flow rate of a single catheter, the number of catheters arranged on the drainage tube per unit length, the flow rate coefficient, the flow rate at the end of the drainage tube, and the diversion length of the drainage tube as:

the flow rate of the anesthetic fluid along the drainage tube constantly changes and is considered to be constant in a small flow section dm, and if considered as a uniform flow, the head loss along the flow section dm in the drainage tube is df:

$$df = \frac{1}{G^2}(N + (S - m)R)^2 \mathrm{dm}$$

integrating the head loss of the small flow section over the diversion length S of the drainage tube can obtain:

$$T = df = \int_0^s \frac{1}{G^2}(N + (S - m)R)^2 \mathrm{dm}$$

$$T = \frac{1}{G^2}\left(N^2 + NRS + \frac{1}{3}R^2S^2\right)$$

since:

$$R=zr$$

it can obtain:

$$T = \frac{1}{G^2}\left(N^2 + NzrS + \frac{1}{3}z^2r^2S^2\right)$$

in the formula: T is the height difference between the level of the anesthetic fluid in the anesthetic fluid tank and the water inlets of the catheters (the dosage of the anesthetic fluid added to the anesthetic fluid tank can be obtained from the fluid level in the anesthetic fluid tank); G is the flow rate coefficient; N is the flow rate at the end of the drainage tube; R is the sum of flow rates of the catheters on the drainage tube per unit length; r is the flow rate of a single catheter; S is the diversion length of the drainage tube, which length is the distance between the first hole and the last hole on the drainage tube; and m is a variable for the diversion length of the drainage tube;

the calculation formula for the flow rate coefficient G is:

$$G=\frac{\pi d^2 u^{1/2} C}{4}$$

in the formula: C is a Chezy coefficient, u is the hydraulic radius of the drainage tube, $u=(d/2)^2\pi/\pi\ d$;

and d is the diameter of the drainage tube.

The Chezy coefficient is calculated using Manning's formula as:

$$C=\frac{1}{n}u^{1/6}$$

to obtain:

$$G=\frac{d^2 u^{2/3}\pi}{4n}$$

in the formula: u is the hydraulic radius of the drainage tube; d is the diameter of the drainage tube; and n is a roughness coefficient, which takes 0.01.

In order to ensure full utilization of the anesthetic fluid, when all the anesthetic fluid flowing through the drainage tube enters the catheters and flows into the closed animal anesthetic tanks, and the flow rate at the end of the drainage tube is zero:

establishing a calculation model for the height difference between the level of the anesthetic fluid in the anesthetic fluid tank and the water inlets of the catheters, the flow rate of a single catheter, the number of catheters arranged on the drainage tube per unit length, the flow rate coefficient, and the diversion length of the drainage tube as:

$$T=\frac{r^2 z^2 S^2}{3G^2}$$

in the formula: T is the height difference between the level of the anesthetic fluid in the anesthetic fluid tank and the water inlets of the catheters; G is the flow rate coefficient; R is the sum of flow rates of the catheters on the drainage tube per unit length; and S is the diversion length of the drainage tube, which length is the distance between the first hole and the last hole on the drainage tube;

counting individual closed animal anesthetic tanks requiring anesthesia and the types, weights and quantities of the experimental animals in individual closed animal anesthetic tanks according to experimental needs, calculating an anesthetic fluid dosage required for each closed animal anesthetic tank to meet precise anesthesia effect required by the experiment, defining the total dosages of the anesthetic fluid required for all the closed animal anesthetic tanks as Y, and then according to the above calculation model, determining the flow rate of a single catheter, the number of catheters arranged on the drainage tube per unit length, the diameter of the drainage tube, the flow rate at the end of the drainage tube, the diversion length of the drainage tube, and the number of catheters in each closed animal anesthetic tank; and adding anesthetic fluid to the anesthetic fluid tank with the dosage of the added anesthetic fluid defined as E, E≥Y, turning on the switch on the drainage tube such that the anesthetic fluid enters the closed animal anesthetic tanks and volatilizes into gas to exert the anesthesia effect and the recycling container accepts the anesthetic fluid at the end of the drainage tube, with the dosage of the anesthetic fluid recovered in the recycling container defined as F, and when F=E−Y is satisfied, turning off the switch on the drainage tube, so that the anesthesia process is completed.

A quantitative and precise gas anesthesia device for experimental animals, which device includes:

an anesthetic fluid tank, a drainage tube, catheters, closed animal anesthetic tanks, and a recycling container, where anesthetic fluid is put into the anesthetic fluid tank, the bottom of the anesthetic fluid tank is connected to an inlet of the drainage tube, several holes are evenly arranged in the drainage tube, each hole is connected to an inlet of each catheter, and outlets of the catheters extend into the closed animal anesthetic tanks; experimental animals requiring anesthesia are put into the closed animal anesthetic tanks, and a recycling container is placed below an outlet of the drainage tube; and a switch is provided on the drainage tube.

Preferably, several sets of the closed animal anesthetic tanks can be provided, and experimental animals of different types and different weights can be placed in the closed animal anesthetic tanks.

Preferably, the drainage tube adopts a PVC tube or a glass tube, and the catheters adopt polyvinyl chloride hoses or glass tubes.

Preferably, the anesthetic fluid adopts ether liquid or isoflurane liquid.

Preferably, the anesthetic fluid tank is provided with a scale to record the dosage of the anesthetic fluid.

The advantages of the present invention are as follows:

1. By means of the anesthesia method provided in the present invention, the dosage of anesthetic fluid can be added in a targeted mode according to experimental animals of different animal types and different weights in the closed animal anesthetic tanks, and meanwhile all the animals achieving quantitative and precise gas anesthesia effect required by experiments in the same period of time can be guaranteed.
2. By using the anesthesia device provided in the present invention, anesthetic fluid can be introduced into the closed animal anesthetic tanks by controlling the diameter of the drainage tube, the number of catheters, etc., and multiple groups of experimental animals can be anesthetized at the same time.
3. By using the calculation model provided in the present invention, the flow rate at the end of the drainage tube can be controlled so that the anesthetic fluid will not be wasted, achieving the effect of fully utilizing the anesthetic fluid.

BRIEF DESCRIPTION OF THE DRAWINGS

In order to illustrate the technical solutions in the embodiments of the present invention more clearly, the accompanying drawings required in the description of the embodiments will be briefly introduced below. Obviously, the accompanying drawings in the following description are some embodiments of the present invention, and those of ordinary skill in the art can also obtain other accompanying drawings based on these accompanying drawings without creative efforts.

In the figures, 1—anesthetic fluid tank; 2—drainage tube; 3—catheter; 4—closed animal anesthetic tank; 5—experimental animal; 6—recycling container; 7—switch; 9—head loss change line; 10—starting line for integrating the head loss of the small flow section over the diversion length of the drainage tube; and 11—terminating line for integrating the head loss of the small flow section over the diversion length of the drainage tube.

DETAILED DESCRIPTION

The technical solutions in the embodiments of the present invention will be clearly and completely described below with reference to the accompanying drawings in the embodiments of the present invention. Obviously, the described embodiments are part of the embodiments of the present invention, not all of them. Based on the embodiments of the present invention, all other embodiments obtained by those of ordinary skill in the art without creative efforts fall within the scope of protection of the present invention.

It should be understood that, when used in this specification and the appended claims, the terms "includes" and "contains" indicate the presence of described features, integers, steps, operations, elements and/or components but do not exclude the presence or addition of one or more other features, integers, steps, operations, elements, components and/or collections thereof.

It should also be understood that the terminology used in the description of the present invention is for the purpose of describing particular embodiments only and is not intended to limit the present invention. As used in this specification and the appended claims, the singular forms "a", "an" and "the" are intended to include the plural forms unless the context clearly dictates otherwise.

It should further be understood that the term "and/or" as used in this specification and the appended claims refers to and includes any and all possible combinations of one or more of the associated listed items.

Example 1

Figure 1:
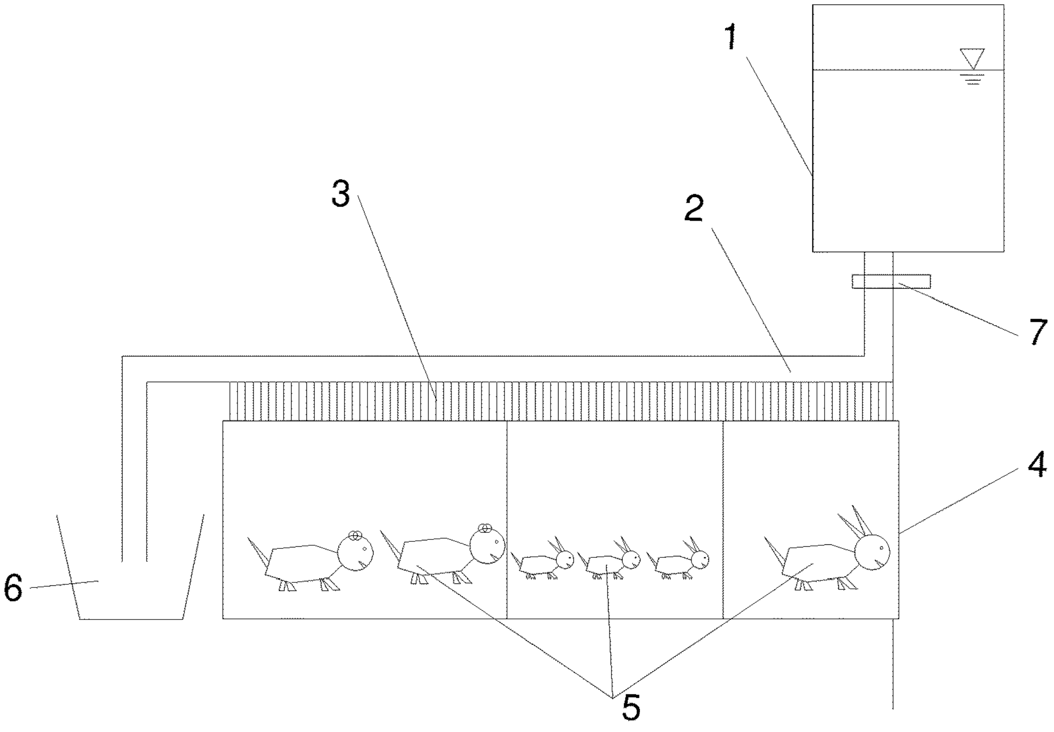
FIG. 1 is a schematic diagram of the anesthesia device of the present invention.
Figure 2:
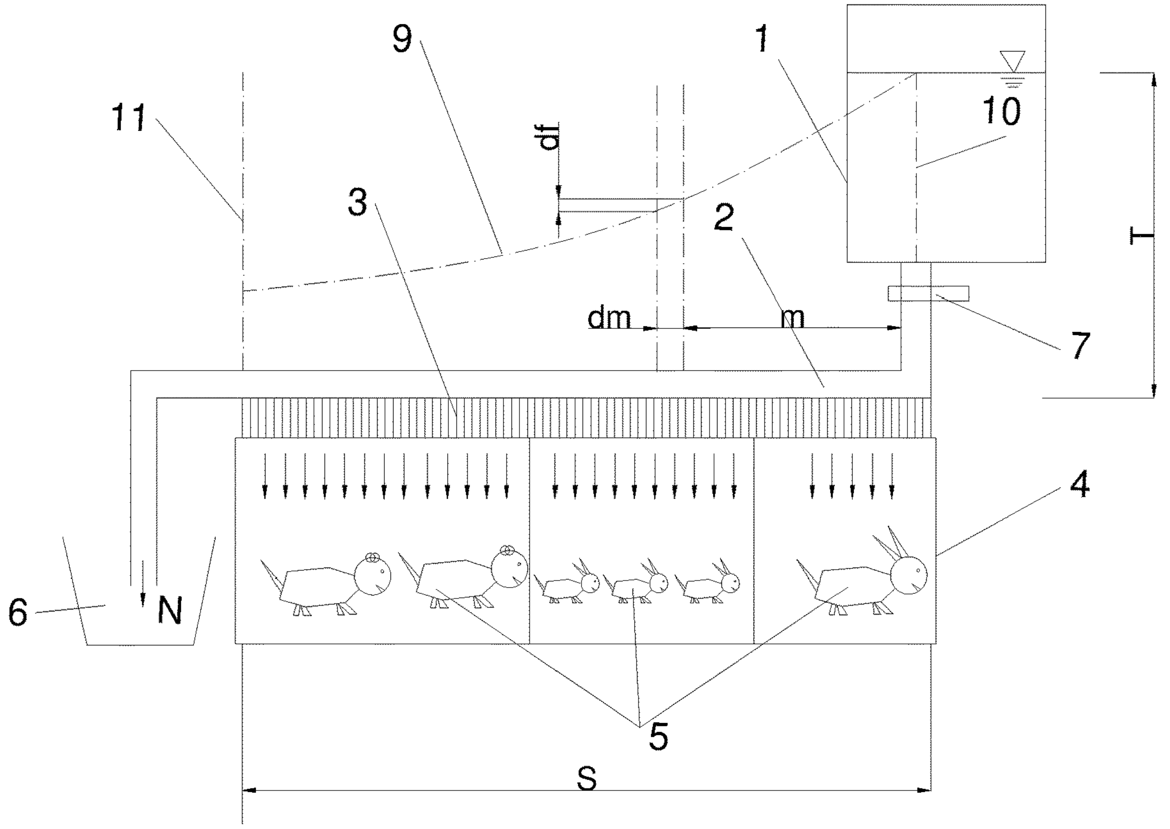
FIG. 2 is a schematic diagram of the calculation model for the anesthesia method of the present invention.

A quantitative and precise gas anesthesia method for experimental animals 5 as provided in FIG. 1 and FIG. 2 includes: an anesthetic fluid tank 1 being used for holding anesthetic fluid, the bottom of the anesthetic fluid tank 1 being connected to an inlet of a drainage tube 2, evenly arrange several holes in the drainage tube 2, each hole being connected to an inlet of each catheter 3, and outlets of the catheters 3 extending into closed animal anesthetic tanks 4; put experimental animals 5 into the closed animal anesthetic tanks 4, and place a recycling container 6 below an outlet of the drainage tube 2; and provide a switch 7 on the drainage tube 2;

define T as the height difference between the level of the anesthetic fluid in the anesthetic fluid tank 1 and water inlets of the catheters 3; define G as a flow rate coefficient; define N as a flow rate at the end of the drainage tube 2; define R as the sum of flow rates of the catheters 3 per unit length on the drainage tube 2; and define S as a diversion length of the drainage tube 2; select experimental animals 5 of different weights and different types for anesthesia experiments, where the experimental animals 5 of different types are numbered A1, A2, A3 to An, type A1 experimental animals 5 of different weights are numbered A11, A12, A13 to A1n, type A2 experimental animals 5 of different weights are numbered A21, A22, A23 to A2n, type An experimental animals 5 of different weights are numbered An1, An2, An3 to Ann, precise anesthetic fluid dosages required for the experimental animals 5 numbered A11, A12, A13 to A1n to meet experimental requirements are respectively a11, a12, a13 to a1n, precise anesthetic fluid dosages required for the experimental animals 5 numbered A21, A22, A23 to A2n to meet experimental requirements are respectively a21, a22, a23 to a2n, and precise anesthetic fluid dosages required for the experimental animals 5 numbered An1, An2, An3 to Ann to meet experimental requirements are respectively an1, an2, an3 to ann; and record the above experimental data as known data;

for example, the experimental animals 5 in two groups of the closed animal anesthetic tanks 4 are anesthetized. There are two identical experimental animals 5 in the first group of closed animal anesthetic tanks 4, with their type numbers being all A1 and weight numbers being all A12. There are an experimental animal 5 of type A2 and weight A23 and the other experimental animal 5 of type A3 and weight A33 in the second group of closed animal anesthetic tanks 4. It can thus be seen that the dosage of the anesthetic fluid required for anesthesia of the experimental animal 5 in the first group of closed animal anesthetic tanks 4 is 2×a12, and the dosage of the anesthetic fluid required for anesthesia of the experimental animal 5 in the second group of incubators is a23+a33;

define the flow rate of a single catheter 3 as r and the number of catheters 3 arranged on the drainage tube 2 per unit length as z, and establish a calculation model for the dosage of the anesthetic fluid added to the anesthetic fluid tank 1, the flow rate of a single catheter 3, the number of catheters 3 arranged on the drainage tube 2 per unit length, the flow rate coefficient, the flow rate at the end of the drainage tube 2, and the diversion length of the drainage tube 2 as:

the flow rate of the anesthetic fluid along the drainage tube 2 constantly changes and is considered to be constant in a small flow section dm, and if considered as a uniform flow, a head loss change line 9 is shown as FIG. 2, and the head loss along the flow section dm in the drainage tube 2 is df:

$$df = \frac{1}{G^2}(N + (S - m)R)^2 \mathrm{dm}$$

integrating the head loss of the small flow section over the diversion length S of the drainage tube 2, that is, from the starting line 10 for integrating the head loss of the small flow section over the diversion length of the drainage tube to the terminating line 11 for integrating the head loss of the small flow section over the diversion length of the drainage tube, can obtain:

$$T = df = \int_0^s \frac{1}{G^2}(N + (S - m)R)^2 \text{dm}$$

$$T = \frac{1}{G^2}\left(N^2 + NRS + \frac{1}{3}R^2S^2\right)$$

since:

$$R = zr$$

it can obtain:

$$T = \frac{1}{G^2}\left(N^2 + NzrS + \frac{1}{3}z^2r^2S^2\right)$$

in the formula:

T is the height difference between the level of the anesthetic fluid in the anesthetic fluid tank 1 and the water inlets of the catheters 3 (the dosage of the anesthetic fluid added to the anesthetic fluid tank 1 can be obtained from the fluid level in the anesthetic fluid tank 1); G is the flow rate coefficient; N is the flow rate at the end of the drainage tube 2; R is the sum of flow rates of the catheters 3 on the drainage tube 2 per unit length; r is the flow rate of a single catheter 3; S is the diversion length of the drainage tube 2, which length is the distance between the first hole and the last hole on the drainage tube 2; and m is a variable for the diversion length of the drainage tube 2;

the calculation formula for the flow rate coefficient G is:

$$G = \frac{\pi d^2 u^{1/2} C}{4}$$

in the formula: C is a Chezy coefficient, u is the hydraulic radius of the drainage tube 2, $u=(d/2)^2\pi/\pi d$, and it can obtain $u=d/4$;

d is the diameter of the drainage tube 2; and n is a roughness coefficient, which takes 0.01.

The Chezy coefficient is calculated using Manning's formula as:

$$C = \frac{1}{n}u^{1/6}$$

to obtain:

$$G = \frac{d^2 u^{2/3} \pi}{4n}$$

in the formula: u is the hydraulic radius of the drainage tube 2; d is the diameter of the drainage tube 2; and n is a roughness coefficient, which takes 0.01.

Count individual closed animal anesthetic tanks 4 requiring anesthesia and the types, weights and quantities of the animals in individual closed animal anesthetic tanks 4 according to experimental needs, calculate an anesthetic fluid dosage required for each closed animal anesthetic tank 4 to meet precise anesthesia effect required by the experiment, define the total dosage of the anesthetic fluid required for all the closed animal anesthetic tanks 4 as Y, and then according to the above calculation model, determine the diameter of the drainage tube 2, the diversion length of the drainage tube 2, and the number of catheters 3 in each closed animal anesthetic tank 4;

it can thus be determined that the number of catheters 3 in the first group of closed animal anesthetic tanks 4 is z1=2×a12/r, and the number of catheters 3 in the second group of closed animal anesthetic tanks 4 is z2=(a23+a33)/r; and add anesthetic fluid to the anesthetic fluid tank 1 with the dosage of the added anesthetic fluid defined as E, E Y, turn on the switch 7 on the drainage tube 2 such that the anesthetic fluid enters the closed animal anesthetic tanks 4 and volatilizes into gas to exert the anesthesia effect and the recycling container 6 accepts the anesthetic fluid at the end of the drainage tube 2, with the dosage of the anesthetic fluid recovered in the recycling container 6 defined as F, and when F=E−Y is satisfied, turn off the switch 7 on the drainage tube 2, so that the anesthesia process is completed.

Example 2

A quantitative and precise gas anesthesia method for experimental animals 5 as provided in FIG. 1 and FIG. 2 includes: an anesthetic fluid tank 1 being used for holding anesthetic fluid, the bottom of the anesthetic fluid tank 1 being connected to an inlet of a drainage tube 2, evenly arrange several holes in the drainage tube 2, each hole being connected to an inlet of each catheter 3, and outlets of the catheters 3 extending into closed animal anesthetic tanks 4; put experimental animals 5 requiring anesthesia into the closed animal anesthetic tanks 4, and place a recycling container 6 below an outlet of the drainage tube 2; and provide a switch 7 on the drainage tube 2;

define T as the height difference between the level of the anesthetic fluid in the anesthetic fluid tank 1 and water inlets of the catheters 3; define G as a flow rate coefficient; define N as a flow rate at the end of the drainage tube 2; define R as the sum of flow rates of the catheters 3 per unit length on the drainage tube 2; and define S as a diversion length of the drainage tube 2;

select experimental animals 5 of different weights and different types for anesthesia experiments, where the experimental animals 5 of different types are numbered A1, A2, A3 to An, type A1 experimental animals 5 of different weights are numbered A11, A12, A13 to A1n, type A2 experimental animals 5 of different weights are numbered A21, A22, A23 to A2n, type An experimental animals 5 of different weights are numbered An1, An2, An3 to Ann, precise anesthetic fluid dosages required for the experimental animals 5 numbered A11, A12, A13 to A1n to meet experimental requirements are respectively a11, a12, a13 to a1n, precise anesthetic fluid dosages required for the experimental animals 5 numbered A21, A22, A23 to A2n to meet experimental requirements are respectively a21, a22, a23 to a2n, and precise anesthetic fluid dosages required for the experimental animals 5 numbered An1, An2, An3 to Ann to meet experimental requirements are respectively an1, an2, an3 to ann; and record the above experimental data as known data;

define the flow rate of a single catheter 3 as r and the number of catheters 3 arranged on the drainage tube 2 per unit length as z, and establish a calculation model for the height difference between the level of the anesthetic fluid in the anesthetic fluid tank 1 and the water inlets of the catheters 3, the flow rate of a single catheter 3, the number of catheters 3 arranged on the drainage tube 2 per unit length, the flow rate coefficient, the flow rate at the end of the drainage tube 2, and the diversion length of the drainage tube 2 as:

the flow rate of the anesthetic fluid along the drainage tube 2 constantly changes and is considered to be constant in a small flow section dm, and if considered as a uniform flow, the head loss along the flow section dm in the drainage tube 2 is:

$$df = \frac{1}{G^2}(N + (S - m)R)^2 \mathrm{dm}$$

integrating the head loss of the small flow section over the diversion length S of the drainage tube 2 can obtain:

$$T = df = \int_0^s \frac{1}{G^2}(N + (S - m)R)^2 \mathrm{dm}$$

$$T = \frac{1}{G^2}\left(N^2 + NRS + \frac{1}{3}R^2S^2\right)$$

since:

$$R = zr$$

in order to ensure full utilization of the anesthetic fluid, when all the anesthetic fluid flowing through the drainage tube 2 enters the catheters 3 and flows into the closed animal anesthetic tanks 4, and the flow rate at the end of the drainage tube 2 is zero:

establish a calculation model for the height difference between the level of the anesthetic fluid in the anesthetic fluid tank 1 and the water inlets of the catheters 3, the flow rate of a single catheter 3, the number of catheters 3 arranged on the drainage tube 2 per unit length, the flow rate coefficient, and the diversion length of the drainage tube 2 as:

$$T = \frac{r^2z^2S^2}{3G^2}$$

in the formula: T is the height difference between the level of the anesthetic fluid in the anesthetic fluid tank 1 and the water inlets of the catheters 3 (the dosage of the anesthetic fluid added to the anesthetic fluid tank 1 can be obtained from the fluid level in the anesthetic fluid tank 1); G is the flow rate coefficient; N is the flow rate at the end of the drainage tube 2; R is the sum of flow rates of the catheters 3 on the drainage tube 2 per unit length; r is the flow rate of a single catheter 3; and S is the diversion length of the drainage tube 2, which length is the distance between the first hole and the last hole on the drainage tube 2;

the calculation formula for the flow rate coefficient G is:

$$G = \frac{\pi d^2 u^{1/2} C}{4}$$

in the formula: C is a Chezy coefficient, u is the hydraulic radius of the drainage tube 2, $u=(d/2)^2\pi/\pi d$;

d is the diameter of the drainage tube 2; and n is a roughness coefficient, which takes 0.01.

The Chezy coefficient is calculated using Manning's formula as:

$$C = \frac{1}{n}u^{1/6}$$

to obtain:

$$G = \frac{d^2u^{2/3}\pi}{4n}$$

in the formula: u is the hydraulic radius of the drainage tube 2; d is the diameter of the drainage tube 2; and n is a roughness coefficient, which takes 0.01.

Count individual closed animal anesthetic tanks 4 requiring anesthesia and the types, weights and quantities of the animals in individual closed animal anesthetic tanks 4 according to experimental needs, calculate an anesthetic fluid dosage required for each closed animal anesthetic tank 4 to meet precise anesthesia effect required by the experiment, define the total dosage of the anesthetic fluid required for all the closed animal anesthetic tanks 4 as Y, and then according to the above calculation model, determine the flow rate of a single catheter 3, the number of catheters 3 arranged on the drainage tube 2 per unit length, the diameter of the drainage tube 2, the flow rate at the end of the drainage tube 2, the diversion length of the drainage tube 2, and the number of catheters 3 in each closed animal anesthetic tank 4; and add anesthetic fluid to the anesthetic fluid tank 1 with the dosage of the added anesthetic fluid defined as E, $E \geq Y$, turn on the switch 7 on the drainage tube 2 such that the anesthetic fluid enters the closed animal anesthetic tanks 4 and volatilizes into gas to exert the anesthesia effect and the recycling container 6 accepts the anesthetic fluid at the end of the drainage tube 2, with the dosage of the anesthetic fluid recovered in the recycling container 6 defined as F, and when $F=E-Y$ is satisfied, turn off the switch 7 on the drainage tube 2, so that the anesthesia process is completed.

Example 3

A quantitative and precise gas anesthesia device for experimental animals 5 as provided in FIG. 1 includes: an anesthetic fluid tank 1, a drainage tube 2, catheters 3, closed animal anesthetic tanks 4, and a recycling container 6, where anesthetic fluid is put into the anesthetic fluid tank 1, the bottom of the anesthetic fluid tank 1 is connected to an inlet of the drainage tube 2, several holes are evenly arranged in the drainage tube 2, each hole is connected to an inlet of each catheter 3, and outlets of the catheters 3 extend into the closed animal anesthetic tanks 4; experimental animals 5 requiring anesthesia are put into the closed animal anesthetic tanks 4, and a recycling container 6 is placed below an outlet of the drainage tube 2; and a switch 7 is provided on the drainage tube 2. Several sets of the closed animal anesthetic tanks 4 can be provided, and experimental animals 5 of different types and different weights can be placed in the closed animal anesthetic tanks 4. The drainage tube 2 adopts a PVC tube or a glass tube, and the catheters 3 adopt polyvinyl chloride hoses or glass tubes. The anesthetic fluid adopts ether liquid or isoflurane liquid. The anesthetic fluid tank 1 is provided with a scale to record the dosage of the anesthetic fluid.

What is claimed is:

1. A quantitative and precise gas anesthesia method for experimental animals, A characterized in comprising steps:

S1: a bottom of an anesthetic fluid tank being connected to an inlet of a drainage tube, evenly arranging several holes in the drainage tube, each of the several holes being connected to a respective inlet of each one of a plurality of catheters, and outlets of the plurality of catheters extending into closed animal anesthetic tanks;

putting the experimental animals into the closed animal anesthetic tanks, and placing a recycling container below an outlet of the drainage tube; and providing a switch on the drainage tube;

S2: defining T as a height difference between a level of the anesthetic fluid in the anesthetic fluid tank and the inlets of the plurality of catheters; defining G as a flow rate coefficient; defining N as a flow rate at an end of the drainage tube; defining R as a sum of flow rates of the catheters per unit length on the drainage tube; and defining S as a diversion length of the drainage tube;

S3: selecting, from the experimental animals, experimental animals of different weights and different types for anesthesia experiments, wherein the experimental animals of different types are numbered A1, A2, A3 to An, type A1 experimental animals of different weights are numbered A11, A12, A13 to A1n, type A2 experimental animals of different weights are numbered A21, A22, A23 to A2n, type An experimental animals of different weights are numbered An1, An2, An3 to Ann, precise anesthetic fluid dosages required for the experimental animals numbered A11, A12, A13 to A1n to meet experimental requirements are respectively a11, a12, a13 to a1n, precise anesthetic fluid dosages required for the experimental animals numbered A21, A22, A23 to A2n to meet the experimental requirements are respectively a21, a22, a23 to a2n, and precise anesthetic fluid dosages required for the experimental animals numbered An1, An2, An3 to Ann to meet the experimental requirements are respectively an1, an2, an3 to ann; and recording all of the precise anesthetic fluid dosages as known data;

S4: defining a flow rate of a single catheter of the plurality of catheters as r and a number of the plurality of catheters arranged on the drainage tube per unit length as z, and establishing a calculation model for the height difference between the level of the anesthetic fluid in the anesthetic fluid tank and the inlets of the plurality of catheters, the flow rate of the single catheter, the number of the plurality of catheters arranged on the drainage tube per unit length, the flow rate coefficient, the flow rate at the end of the drainage tube, and the diversion length of the drainage tube as a first formula:

$$T = \frac{1}{G^2}\left(N^2 + NzrS + \frac{1}{3}z^2r^2S^2\right)$$

in the first formula: T is the height difference between the level of the anesthetic fluid in the anesthetic fluid tank and the water inlets of the catheters, and a dosage of the anesthetic fluid added to the anesthetic fluid tank is obtained from the fluid level in the anesthetic fluid tank; G is the flow rate coefficient; N is the flow rate at the end of the drainage tube; R is the sum of flow rates of the catheters on the drainage tube per unit length; r is the flow rate of the single catheter; and S is the diversion length of the drainage tube, the diversion length being a distance between a first hole of the several holes in the drainage tube and a last hole of the several holes in the drainage tube;

S5: counting the individual closed animal anesthetic tanks requiring anesthesia and the different types, the different weights and quantities of the experimental animals in the individual closed animal anesthetic tanks according to the experimental requirements, calculating an anesthetic fluid dosage required for each closed animal anesthetic tank to meet a precise anesthesia effect required by the experiment, defining a total dosages of the anesthetic fluid required for all the closed animal anesthetic tanks as Y, and then according to the first formula, determining the flow rate of the single catheter, the number of catheters arranged on the drainage tube per unit length, a diameter of the drainage tube, the flow rate at the end of the drainage tube, the diversion length of the drainage tube, and the number of catheters in each closed animal anesthetic tank; and A S6: adding anesthetic fluid to the anesthetic fluid tank with the dosage of the anesthetic fluid added to the anesthetic fluid tank defined as E, E≥Y, turning on the switch on the drainage tube such that the anesthetic fluid enters the closed animal anesthetic tanks and volatilizes into gas to exert the precise anesthesia effect required and the recycling container accepts the anesthetic fluid at the end of the drainage tube, with a dosage of the anesthetic fluid recovered in the recycling container defined as F, and when F=E−Y is satisfied, turning off the switch on the drainage tube, so that the anesthesia method is completed;

a second formula for the flow rate coefficient is:

$$G = \frac{\pi d^2 u^{1/2} C}{4}$$

in the second formula: C is a Chezy coefficient, u is a hydraulic radius of the drainage tube, $u=(d/2)^2\pi/\pi d$; and d is the diameter of the drainage tube;

the Chezy coefficient is calculated using Manning's formula as:

$$C = \frac{1}{n}u^{1/6}$$

a third formula to obtain:

$$G = \frac{d^2 u^{2/3}\pi}{4n}$$

in the third formula: u is the hydraulic radius of the drainage tube; d is the diameter of the drainage tube; and n is a roughness coefficient, which is 0.01.

2. The quantitative and precise gas anesthesia method for experimental animals according to claim 1, characterized in comprising:

when all the anesthetic fluid flowing through the drainage tube enters the catheters and flows into the closed animal anesthetic tanks, and the flow rate at the end of the drainage tube is zero:

establishing a calculation model for the height difference between the level of the anesthetic fluid in the anesthetic fluid tank and the inlets of the plurality of catheters, the flow rate of the single catheter of the plurality of catheters, the number of catheters of the plurality of catheters arranged on the drainage tube per unit length, the flow rate coefficient, and the diversion length of the drainage tube as a fourth formula:

$$T = \frac{r^2 z^2 S^2}{3G^2}$$

in the fourth formula: T is the height difference between the level of the anesthetic fluid in the anesthetic fluid tank and the inlets of the catheters; G is the flow rate coefficient; and S is the diversion length of the drainage tube, the diversion length being the distance between the first hole of the several holes in the drainage tube and the last hole of the several holes in the drainage tubes.

3. A quantitative and precise gas anesthesia device for experimental animals that implements the anesthesia method of claim 1, characterized in comprising:

the anesthetic fluid tank, the drainage tube, the plurality of catheters, the closed animal anesthetic tanks, and the recycling container, wherein the anesthetic fluid is put into the anesthetic fluid tank, the bottom of the anesthetic fluid tank is connected to the inlet of the drainage tube, the several holes are evenly arranged in the drainage tube, each of the several holes is connected to a respective inlet of each of the plurality of catheters, and outlets of the plurality of catheters extend into the closed animal anesthetic tanks; the experimental animals requiring anesthesia are put into the closed animal anesthetic tanks, and the recycling container is placed below the outlet of the drainage tube; and the switch is provided on the drainage tube.

4. The quantitative and precise gas anesthesia device for experimental animals according to claim 3, characterized in that several sets of the closed animal anesthetic tanks are provided, and the experimental animals of different types and different weights are placed in the closed animal anesthetic tanks.

5. The quantitative and precise gas anesthesia device for experimental animals according to claim 3, characterized in that the drainage tube comprises a PVC tube or a glass tube, and the catheters comprise polyvinyl chloride hoses or glass tubes.

6. The quantitative and precise gas anesthesia device for experimental animals according to claim 3, characterized in that the anesthetic fluid comprises ether liquid or isoflurane liquid.

7. The quantitative and precise gas anesthesia device for experimental animals according to claim 3, characterized in that the anesthetic fluid tank is provided with a scale to record the dosage of the anesthetic fluid added to the anesthetic fluid tank.

* * * * *